P. J. DONAVAN
Feb. 21, 1933. BRAKE TESTING MACHINE Re. 18,745
Original Filed May 8, 1926 2 Sheets-Sheet 1
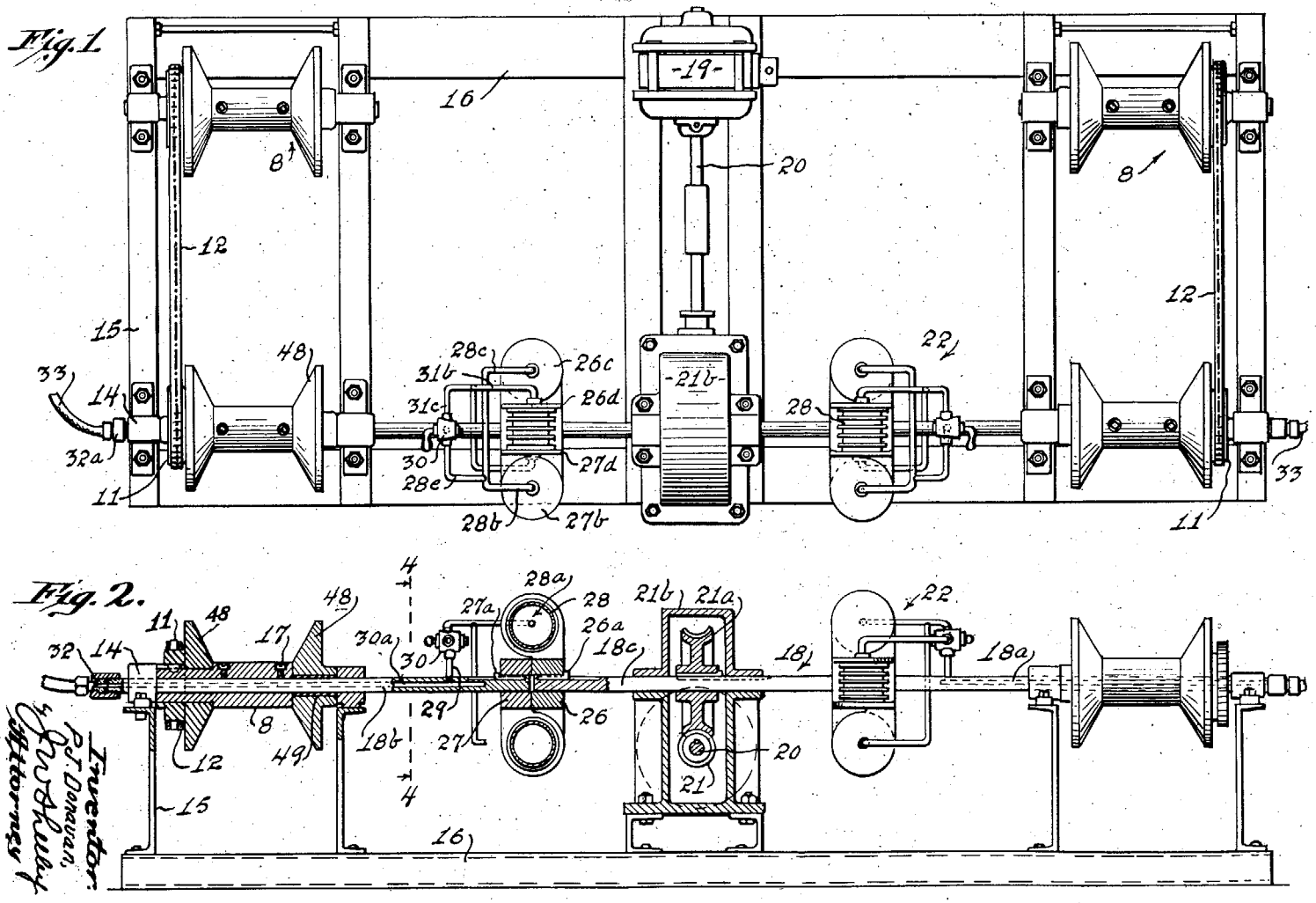

P. J. DONAVAN

Feb. 21, 1933. BRAKE TESTING MACHINE Re. 18,745

Original Filed May 8, 1926 2 Sheets-Sheet 2

Inventor.
P. J. Donavan,
by J. W. Shelley
Attorney.

Reissued Feb. 21, 1933

Re. 18,745

UNITED STATES PATENT OFFICE

PAUL J. DONAVAN, OF POMONA, CALIFORNIA, ASSIGNOR, BY MESNE ASSIGNMENTS, TO BENDIX-COWDREY BRAKE TESTER INC., OF FITCHBURG, MASSACHUSETTS, A CORPORATION OF DELAWARE

BRAKE TESTING MACHINE

Original No. 1,755,287, dated April 22, 1930, Serial No. 107,679, filed May 8, 1926. Application for reissue filed April 13, 1931. Serial No. 529,863.

The present invention relates to brake testing machines of the general type disclosed in Patent No. 1,565,717, granted to me on the 15th day of December, 1925.

In the device shown in the said patent, two dynamometers are employed together with means for rendering one dynamometer inoperative while a reading is being taken from the other. Said machine includes a differential gear and braking means for selectively rendering either dynamometer inoperative.

The present invention has among its objects the provision of a simplified mechanism whereby the braking means and the differential may be eliminated.

In order to expediently and efficiently adjust a pair of brakes equally, with the aid of a brake testing machine, it has been found advisable to provide mechanism which will permit of taking a dynamometer reading for both brakes at the same time. This is desirable because it expedites the work of testing the brakes, and also because it is found that the readings taken give a more accurate indication of the action of the brakes under road conditions when both brake wheels are rotated throughout the brake testing operation. Present types of machines for taking simultaneous and comparative reading of two dynamometers; one for each brake of an automobile, consists of two electric motors, each independent and each driving a corresponding vehicle wheel against the braking action of the corresponding brake. By noting the consumption of electro-motive force of each motor, a comparative check is supposedly made. Inasmuch as no two motors under all conditions deliver exactly the same amount of power for the amount of energy consumed, such devices are not accurate, and in addition are quite costly.

Another object of this invention is to provide a brake testing machine in which a single motor may be used to test both brakes at the same time.

Another object of the invention is to provide improved dynamometers and dynamometer gauge means for brake testing machines.

In brake testing machines employed heretofore two pairs of spaced rollers are provided and the brakes of a vehicle are tested by causing each set of rollers to frictionally engage and drive the tire of the corresponding vehicle wheel, against the resistance of the brake for that wheel. Usual rollers are found to show a tendency to dislodge the vehicle wheel from proper position. To overcome this tendency it has been proposed to make the rollers in the form of integrally flanged spools or "niggerheads." Such devices are found to be destructive to tires because certain portions of the surfaces, coming in contact of the running tires, run at speeds which differ from the speeds at which the contacting portion of the tire moves.

It is therefore another object of the invention to provide improved traction rollers for brake testing machines with a view to eliminating friction between the rollers and the tire.

Still other objects of my invention will appear hereinafter.

I have illustrated the invention with the accompanying drawings, in which:—

Figure 1 is a plan view of a preferred embodiment of my invention.

Figure 2 is a view in side elevation thereof with parts in section.

Figure 3:
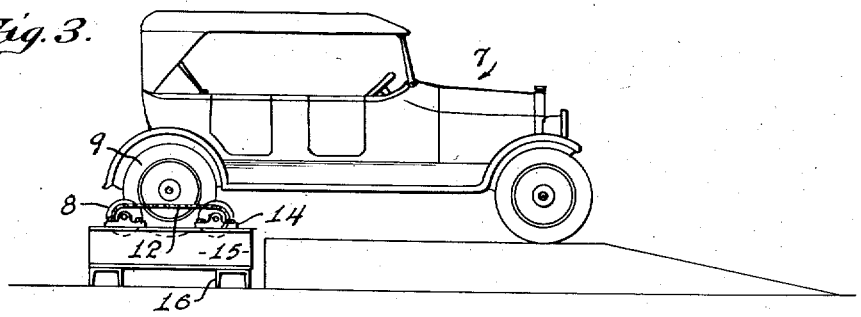

Figure 3 on a reduced scale is a side view of an automobile having its rear wheels in engagement with the brake testing device of Figure 1.

Figure 4:
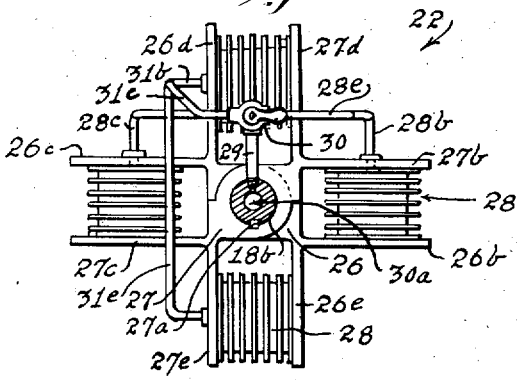

Figure 4 is a view in section on a line 4—4 of Figure 2.

Figure 5:
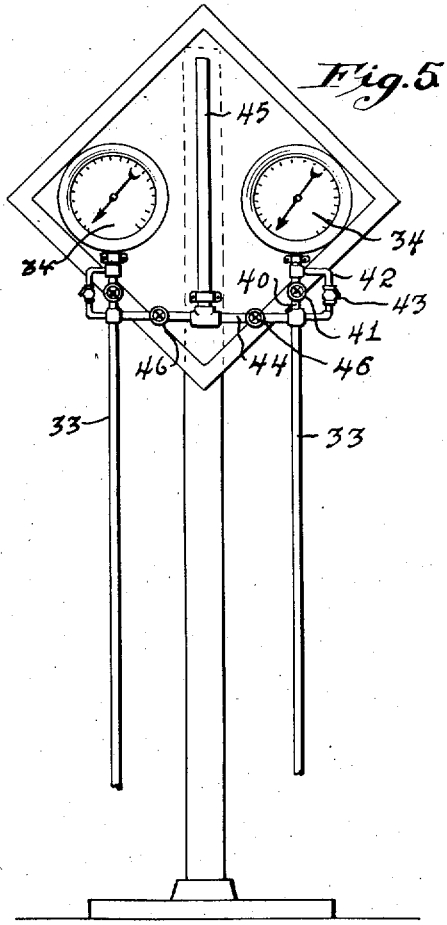
Figure 6:
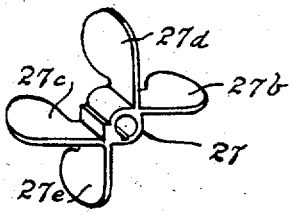

Figure 5 is a front elevation of a stand for supporting the pressure gages to be described; and Figure 6 is a perspective view of a portion of the dynamometer to be described.

In carrying out my invention in the embodiment illustrated, I employ two sets of rollers, such as 8, the sets being spaced apart a suitable distance, and each roller of a set being spaced from the other roller of the set a suitable distance to retain a vehicle wheel 9 between them, in the position shown. In such position the weight of the vehicle holds the wheel in frictional contact with both rollers of a set. Said rollers are connected by means of sprockets 11 and chains 12, the sprockets being keyed or otherwise secured to an extension upon the rollers 8 as shown in Figure 2. The usual arrangement of such rollers, chains and sprockets, are well understood in the art and need no further description herein. Said rollers are suitably supported by bearings 14 secured to transverse beams 15; the beams being shown as supported on skids 16. One of the rollers of each set is secured, as at 17, to the corresponding end of a drive shaft 18. The drive shaft includes end sections $18^a$ and $18^b$, respectively, and an intermediate section $18^c$.

A single electric motor 19 is provided, having a drive shaft 20, carrying a worm 21. The intermediate portion $18^c$, of shaft 18, carries a worm-wheel $21^a$; the worm and worm-wheel are enclosed in a casing $21^b$ and provide a complete reduction gear between the motor and the two sets of rollers.

In conformity with a salient feature of my invention, I provide two dynamometers 22, connecting respective ends of the shaft section $18^c$, to corresponding ends of the sections $18^a$ and $18^b$, respectively. Said dynamometers are in the form of slightly flexible connections which permit the intermediate shaft to move a few degrees in advance of the other shaft sections while driving same positively. Any suitable torque-registering flexible connection will serve between the shaft sections for carrying out my invention.

It will be apparent from the foregoing that when the motor is running, both sets of rollers will be driven thereby. The individual torque to which the sections $18^a$ and $18^b$, respectively, are individually subjected will depend upon the resistance offered by the corresponding set of rollers.

Each of the dynamometers illustrated is provided with two pairs of drums or bellows, one pair of drums being provided to confine the pressure transmitting liquid while the shaft 18 is rotated in one direction and the other pair of drums serves to confine the pressure transmitting liquid during the rotation of the shaft 18 in the opposite direction. The drums of each dynamometer have one end connected to pressure transmitting means secured to an end of the driving shaft $18^c$, and each drum has its opposite end secured to pressure transmitting means secured to a shaft section $18^a$ or $18^b$.

Referring particularly to Figure 2, each dynamometer is the same in construction, and I will now describe the dynamometer which connects shaft section $18^b$ with the intermediate shaft section $18^c$. Said dynamometer is provided with separate disconnected bosses 26 and 27 respectively. Boss 26 is keyed to section $18^c$, as by key $26^a$, while boss 27 is connected to shaft section $18^b$ by the key $27^a$.

Boss 27 is provided with a pair of tangentially disposed forwardly driving vanes $27^b$ and $27^c$ respectively; said vanes being shown as integral parts of boss 27. Boss 26 is likewise provided with integral forwardly driven vanes $26^b$ and $26^c$ respectively. The dynamometers each includes a plurality of bags or bellows 28, of the corrugated metal type, and each bag provides and encloses a fluid tight interior space $28^a$, which decreases in volume as the bag is compressed. One such bag is provided between vanes $26^b$ and $27^b$, while another such bag is provided between vanes $26^c$ and $27^c$. Each bag is filled with a suitable fluid preferably oil which is comparatively incompressible. It will be apparent now that as two vanes such as $26^b$ and $26^c$ drive the corresponding vanes $27^b$ and $27^c$, the bags confined between these vanes will be compressed, and the contained fluid will be placed under a pressure which will be indicative of the torque required to drive the set of rollers which is connected with shaft section $18^b$.

The bag which is mounted between vanes $26^b$ and $27^b$ is provided with a pipe $28^b$, and the bag which is between vane $26^c$ and vane $27^c$ is provided with a pipe $28^c$. Said pipes are connected to a pipe $28^e$, which leads to a common two-way plug cock 30. Said plug cock has a pipe $29^a$, leading into a bore $30^a$ in the shaft section $18^b$.

Boss 27 is provided with integral reverse driving vanes $27^d$ and $27^e$, respectively, while boss 26 is provided with corresponding vanes $26^d$ and $26^e$, respectively. The bag, which is between vane $26^d$ and vane $27^d$ is provided with a pipe $31^b$, and the bag which is between vane $26^e$ and vane $27^e$, is provided with a pipe $31^e$. Said pipes are also connected to each other and are connected to the plug cock 30 by the pipe $31^c$ which leads to the two-way plug at a point diametrically opposed to pipe $28^e$. Thus by turning the two-way plug to one position, the bellows which register forward torque will be in fluid communication with the interior of the shaft section $18^b$, and by moving the two-way plug to another position, the bellows which register reverse torque will be in fluid communication with the interior of the shaft. Therefore, when the shaft end sections are being driven forwardly, the plug cock should be set so that the forward registering bags are in fluid connection with the bore of the shaft, while the other bags are closed from communication. When it is desired to reverse the direction of rotation of the rollers, the motor is reversed and the plug cock is turned so that the reverse registering bags are in fluid communication with the corresponding bores of the end shaft sections, while the bags which register forward torque are closed from communication with such bores. As a result of this construction the automobile wheels may be rotated in either a forward or rearward direction under brake resistance.

The bore of each end shaft section leads to the outer end of the shaft at which end is provided a non-revoluble nipple 32, held by a nut 32[a]. To each nipple there is connected a flexible conduit 33, leading to a fluid pressure gauge 34. Two gauges are provided; one for each dynamometer, and the conduits 33 are in no manner connected to each other when the device is in operation.

Each conduit leads to the corresponding gauge through a pipe 40. Such pipe is provided with a check valve 41, and a by-pass line 42, having a valve 43 by-passing the check valve 41. Pipes 40 are connected below the by-pass lines by a transverse pipe 44; said transverse pipe is connected with a single glass filling tube 45. Valves 46—46 are also provided; one between each pipe 40 and the filling tube 45. To fill the conduits and bags, valves 46—46 are opened and fluid is poured into the filler tube slowly. Valves 46, 46 are now closed so that the conduits 33 are separated from communication with each other. By closing either valve 43 the corresponding check valve will hold the gauge at the maximum reading.

The operation of the device is as follows:—When the bags are filled, the valves are adjusted so that the respective conduits 33 are in communication with the corresponding gauges but are not in communication with each other. The gauges are placed at a suitable elevation so that the bags are subject to a substantially initial pressure to keep said bags properly inflated. The car on which the brakes are to be tested is placed so that corresponding wheels rest on corresponding sets of rollers. The motor is energized, causing the intermediate shaft section 18[c] to turn and drive the end sections of the shaft through the dynamometers. As one vane of a dynamometer drives the other vane, through the medium of the interposed bag, said bag is compressed slightly and the contained fluid is placed under pressure. The pressure of the fluid, as shown by the gauge, is indicative of the torque required to drive the corresponding set of rollers against the resistance offered by the vehicle wheel. While the brakes of the vehicle are set, the brake bands and their adjustments may be manipulated while the motor is running. The bags of the opposite brake testing devices will simultaneously indicate, in terms of fluid pressure, the amount of torque required to drive the corresponding set of rollers, and in order to accurately adjust a pair of brakes, it is only necessary to make such adjustments as will cause both gauges to read the same in terms of fluid pressure.

Each of the rollers is provided with a pair of loose flanges 48, and one of these flanges is provided with a bearing or bushing 49 which permits the flange to turn on the roller-supporting shaft 18[b], while the other flange is rotatably mounted upon an extension provided upon the roller 8. Said flanges are preferably of obtuse, frusta-conical form, and since they are free to rotate relatively to the roller 8 they obviously may be driven at corresponding speed by an tire portion which touches it, independently of the speed at which the roller turns.

It will be apparent from the foregoing that I have provided for obtaining a dynamometer test on two brakes at the same time with the use of only one motor and without the aid of differential braking means, disconnecting couplings and the like, and While I have shown and described a specific embodiment of my invention, I do not limit myself to any specific construction or arrangement of parts, and may alter the construction and arrangement of parts as I desire or as occasion requires without enlarging the scope of my invention as set forth in the appended claims.

I claim:—

1. A brake tester for testing the brake action on the wheels of an automobile that the brake resistance on opposite wheels may be compared and equalized, comprising, wheel supporting and turning means for supporting and turning the opposite wheels of an automobile, including a power shaft, a motor for and driving said shaft, driving connections constructed to insure the simultaneous rotation of the wheel, said connections including fluid confining receptacles interposed in the power shaft and adapted to exert a pressure on the confined fluid corresponding to the driving force imparted to an automobile wheel to turn it under brake resistance, and an indicator adapted to be actuated by the pressure exerted upon said confined fluid.

2. A brake tester for testing the brake action on the wheels of an automobile that the brake resistance on opposite wheels may be compared and equalized, comprising, means for supporting and turning the opposite wheels of an automobile, including wheel supporting members, a motor for driving the wheel supporting members, driving connections between the motor and said members constructed to insure simultaneous rotation of the wheel supporting members, and driving couplings provided with one set of fluid confining receptacles for rotating the wheels of the automobile in a forward direction and another set of fluid confining receptacles for rotating the wheels of the automobile in the rearward direction, each fluid confining receptacle being constructed to subject the confined fluid to a pressure proportional to the applied turning force, and an indicator adapted to be actuated by the pressure exerted upon said confined fluid.

3. In a brake-testing machine, a shaft consisting of two shaft sections, a driving connection between the shaft sections comprising, a pair of juxtaposed relatively movable vanes one being secured to each shaft section so that the vanes lie opposite each other, a fluid containing receptacle between the vanes, one shaft section being provided with a bore opening, a conduit leading from said receptacle to said bore, and fluid actuated indicating means connected to said bore.

4. In a brake testing machine, a shaft formed of two sections, a yielding driving connection between the shaft sections comprising, a pair of juxtaposed relatively movable vanes one being secured to each shaft section so that the vanes lie opposite each other, a fluid containing receptacle between the vanes, one shaft section being provided with a bore opening, a conduit leading from the receptacle to said bore, a fluid pressure gage and a conduit connecting the bore of said shaft with said gage.

5. In a brake testing machine, means for supporting and rotating an automobile wheel under brake resistance, a divided power transmitting shaft for operating said means, means acting upon a portion of the shaft to drive the shaft, a pair of spaced relatively movable vanes arranged to form a yielding driving connection between the divided sections of the shaft, a fluid confining receptacle between said vanes, and pressure responsive means constructed and arranged to be actuated by the pressure within the receptacle.

6. A device for testing the brakes of an automobile that the brake resistance exerted upon the opposite wheels may be compared and equalized, comprising in combination, means adapted to support and turn a wheel of an automobile under brake resistance, a driving motor for said means, a yielding driving connection between said motor and means including a fluid confining receptacle constucted to subject the confined fluid to a pressure proportional to the applied turning force and adapted to be rotated by said motor in opposite directions to turn the wheel in either a forward or rearward direction, and an indicator adapted to be actuated by the wheel turning pressure exerted upon said confined fluid.

7. A device for testing the brakes of an automobile that the brake resistance exerted on a wheel of an automobile may be determined, comprising in combination, means adapted to support and turn a wheel of an automobile in either a forward or rearward direction under brake resistance, a driving motor for driving said means in either direction, a yielding driving connection between said motor and means including fluid compressing receptacles, one of which serves to transmit the rotative movement to the automobile wheel in its forward direction and the other to transmit the rotative movement to the wheel in its rearward direction, and pressure responsive means connected to said receptacles and adapted to be actuated by the pressure of the confined fluid to indicate the force exerted to rotate the wheel in either direction.

8. A device for testing the brakes of an automobile that the brake resistance exerted upon the opposite wheels may be compared and equalized, comprising in combination, rollers adapted to support and turn the opposite wheels of an automobile under brake resistance, a source of power, means for driving the rollers for both automobile wheels from said source of power, including a yielding driving connection between the rollers for one wheel and the source of power and a yielding driving connection between the rollers for the other wheel and source of power, each yielding driving connection consisting of cooperating parts yieldingly connected to rotate the rollers in one direction and other cooperating parts yieldingly connected to rotate the rollers in the opposite direction, and force responsive means associated with said yielding driving connections and adapted to indicate the force applied to each wheel to turn it in either direction.

9. A brake tester for testing the action of the brakes simultaneously upon the opposite wheels of an automobile, comprising a pair of rollers for supporting one wheel of an automobile under brake resistance, a second pair of rollers for supporting the opposite wheel of the automobile under brake resistance, a single source of power for driving both pairs of rollers to rotate the wheels, driving connections between the source of power and rollers constructed to insure simultaneous rotation of both pairs of rollers throughout the brake testing operation and including three aligned shafts, means for driving the intermediate shaft from the source of power, fluid driving couplings between the intermediate shaft and the shafts aligned therewith and constructed to vary the pressure upon the confined fluid as the turning force exerted upon a wheel varies, and an indicator connected with each fluid coupling to indicate variations in the pressure upon the confined fluid.

10. A brake tester for testing the action of the brakes upon the wheels of an automobile so that the brake action upon the wheels may be compared and equalized, comprising wheel supporting and rotating means, including a power driven shaft, a fluid driving connection interposed between the shaft and wheel supporting means including a pair of juxtaposed, relatively movable vanes having means for confining a fluid between them to vary the pressure upon the fluid as the turning force exerted upon the wheel varies, and an indicator connected with the fluid confining means to be operated by variation of the pressure upon the confined fluid.

11. A brake tester for testing the action of the brakes upon the wheels of an automobile that the brake action upon the wheels may be compared and equalized, comprising two wheel supporting rollers for supporting one of the wheels of an automobile, two wheel supporting rollers for supporting the opposite wheel of an automobile, power means, and driving connections between the power means and each pair of rollers for insuring simultaneous rotation of the opposite roller supporting wheels to rotate the wheels under brake resistance, a fluid driving coupling included in the driving connection between the source of power and each pair of rollers and constructed to vary the pressure upon the confined fluid as the turning force exerted upon a wheel varies, and an indicator connected with each fluid coupling to be operated by variations of the pressure upon the confined fluid.

In testimony whereof, I have hereunto signed my name.

PAUL J. DONAVAN.